United States Patent
Park et al.

(10) Patent No.: US 8,723,792 B2
(45) Date of Patent: May 13, 2014

(54) SYSTEM FOR CONTROLLING DEVICES AND INFORMATION ON NETWORK BY USING HAND GESTURES

(75) Inventors: Ji Hyung Park, Seoul (KR); Hyung Lae Lee, Seoul (KR); Hee Seok Jeong, Changwon-si (KR); Ki Won Yeom, Goyang-si (KR); Joong-Ho Lee, Yongin-si (KR); Hyun-Jin Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 281 days.

(21) Appl. No.: 12/417,848

(22) Filed: Apr. 3, 2009

(65) Prior Publication Data

US 2010/0073287 A1   Mar. 25, 2010

(30) Foreign Application Priority Data

Jun. 25, 2008  (KR) ........................ 10-2008-0060351

(51) Int. Cl.
*G06F 3/033* (2013.01)
(52) U.S. Cl.
USPC ............. 345/157; 345/538; 345/536; 345/90; 345/42
(58) Field of Classification Search
None
See application file for complete search history.

(56) References Cited

U.S. PATENT DOCUMENTS

| | | | | |
|---|---|---|---|---|
| 6,160,899 A | * | 12/2000 | Lee et al. | 382/103 |
| 2006/0010400 A1 | * | 1/2006 | Dehlin et al. | 715/856 |
| 2007/0005607 A1 | * | 1/2007 | Fukuta et al. | 707/10 |
| 2007/0057912 A1 | * | 3/2007 | Romriell et al. | 345/156 |
| 2007/0066323 A1 | | 3/2007 | Park et al. | |

FOREIGN PATENT DOCUMENTS

| | | |
|---|---|---|
| JP | 10-224875 A | 8/1998 |
| WO | WO02/07073 A2 | 1/2002 |
| WO | WO2004/047011 A2 | 6/2004 |

OTHER PUBLICATIONS

EPO—Supplementary European Search Report for counterpart EP 09 77 0402 of Oct. 29, 2012.

* cited by examiner

*Primary Examiner* — Joseph Haley
*Assistant Examiner* — Ifedayo Iluyomade
(74) *Attorney, Agent, or Firm* — Ladas & Parry LLP

(57) ABSTRACT

The disclosure relates to a system for controlling devices and information on a network by hand gestures, and more particularly, to a system for controlling devices and information on a network by hand gestures in which a device or a file to be controlled is selected by a user and a display device is pointed so that information and data can be shared and that various devices can be coupled to each other easily and can be controlled easily.
The system for controlling devices and information on a network by hand gestures can remarkably improve the interaction between various input and display devices and a user under a ubiquitous computing environment.

10 Claims, 9 Drawing Sheets

SYSTEM FOR CONTROLLING DEVICES AND INFORMATION ON NETWORK BY USING HAND GESTURES

CROSS-REFERENCE TO RELATED APPLICATION

This application claims the benefit under 35 U.S.C. §119(a) of a Korean Application No. 10-2008-0060351, filed on Jun. 25, 2008 in the Korean Intellectual Property Office, the entire disclosure of which are hereby incorporated by reference.

BACKGROUND

1. Technical Field

The present invention relates to a system for controlling devices and information on a network by hand gestures, and more particularly, to a system for controlling devices and information on a network by hand gestures in which a device or a file to be controlled is selected by a user and a display device is pointed so that information and data can be shared and that various devices can be easily coupled to each other and can be easily controlled.

2. Description of the Related Art

In the beginning, the user interface was desired as a text based interface for interacting with a computer, in which a user inputs a command using a keyboard. Later, with the introduction of such an input mechanism as a mouse, the user interface was developed into an icon based menu system.

Recently, with the development of the computer environment, the requirements by the users are becoming more complicated, and technologies enabling interfacing with various devices are being developed. Under a ubiquitous environment, in order to connect a specific input device to another input device, for example, in order to connect a personal computer (PC) to a projector or another device, complicated setting processes of separating a keyboard or a mouse or of connecting and disconnecting a universal serial bus (USB) storage medium for data sharing are required.

Therefore, it is required to develop a system for forming a network among the various devices through direct interaction without the complicated setting processes.

SUMMARY OF THE DISCLOSURE

The present invention has been made in an effort to solve the above-described problems associated with the prior art and to provide a system for controlling devices and information on a network by hand gestures capable of improving an interaction between various input and display devices and a user under a ubiquitous computing environment.

A system for controlling devices and information on a network by hand gestures according to an exemplary embodiment of the present invention includes a control device for searching a data input or a file selection, a controlled device for interpreting data transferred from the control device to display the interpreted data, and a management server for, when a control device is selected by a user and when a controlled device is pointed by a hand gesture of the user, analyzing the hand gesture of pointing the controlled device to network couple the selected control device and the pointed controlled device to each other.

The management server includes a coupling management module for controlling network coupling based on an Internet protocol (IP) address and a port number of the control device and a gesture sensing module for analyzing vision information of photographing a hand gesture of a user to interpret the hand gesture of the user.

The system can further include a camera for photographing a hand gesture of a user and for providing an image filtered based on an algorithm of searching and tracking a hand or an end of a finger to the management server.

The system can further include a camera for photographing the controlled device and for providing an image of tracking a position of the controlled device to the management server.

The camera may be a universal serial bus (USB) web camera or a network camera.

The control device is a virtual keyboard or mouse on a table top display and a user generates an icon for virtual coupling on the table top display, attaches the icon to the virtual keyboard or mouse, and points the controlled device by a hand gesture to connect the pointed controlled device.

The management server performs network coupling between at least one control device and at least one controlled device by sensing at least two hand gestures.

A method of networking devices by hand gestures according to another exemplary embodiment of the present invention includes searching a data input or a file selection by at least one control device, pointing at least one controlled device by a hand gesture of a user, analyzing the hand gesture of pointing the controlled device to sense the pointed controlled device, and network coupling the sensed controlled device and the control device to each other.

In sensing the pointed controlled device, the pointed controlled device is sensed based on hand gesture direction information obtained by analyzing a vision information in an image of photographing a hand gesture of a user and based on previously stored information on positions of controlled devices.

In sensing the pointed controlled device, the pointed controlled device is sensed based on hand gesture direction information obtained by analyzing a vision information in an image of photographing a hand gesture of a user and based on information on positions of controlled devices obtained from an image of photographing the controlled devices.

In network coupling the sensed controlled device and the control device to each other, network coupling is performed using a network identification address of the control device and a network identification address of the controlled device.

The method can further include controlling, the controlled device by the control device using the coupled network.

The system for controlling devices and information on a network by hand gestures according to the present invention can remarkably improve the interaction between various input and display devices and a user under a ubiquitous computing environment.

In addition, in the system for controlling devices and information on a network by hand gestures according to the present invention, a remote information control can be performed by a conventional application such as an MS Office, a web browser, and a multimedia program by selecting a file and pointing a specific position by a hand.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a system for controlling devices and information on a network by hand gestures according to preferred an exemplary embodiment of the present invention will be described in detail with reference to the accompanying drawings.

Figure 1:
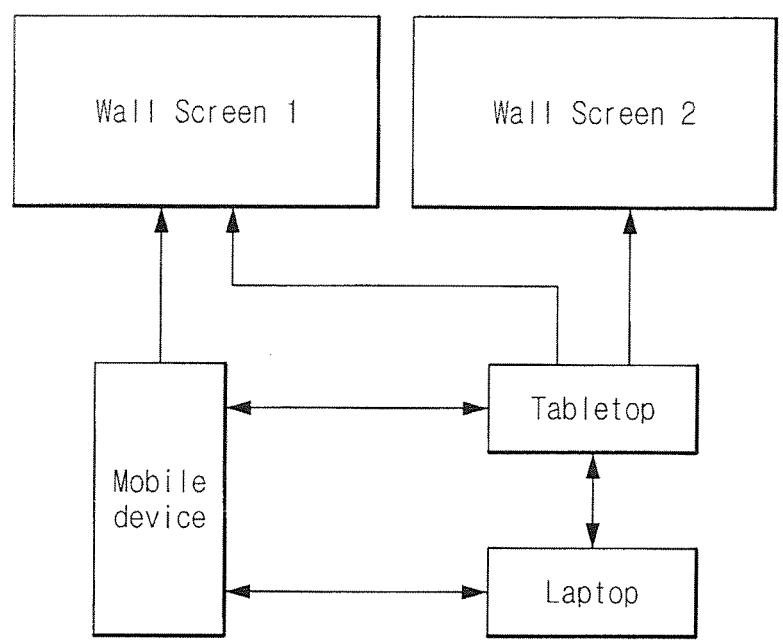
FIG. 1 is a view illustrating a system for controlling devices and information on a network by hand gestures according to an exemplary embodiment of the present invention.

FIG. 1 is a view illustrating a system for controlling devices and information on a network by hand gestures according to an exemplary embodiment of the present invention. The system for controlling devices and information on a network by hand gestures according to the present invention can virtually couple various devices on a network, for example, a wall screen, a mobile communication terminal, a table top, and a laptop to each other by simple hand gestures.

According to the present invention, as a direct interaction, a user can share a file or can establish or change coupling among devices only by simple hand gestures. For example, when the user desires to transfer a document file on a table top display to a wall screen and to display the transferred document file on the wall screen, the user selects the document file on the table top display, points the wall screen, and transfers the selected document file to the wall screen. In addition, after network coupling is established between the wall screen and the laptop by a hand gesture and the network coupling is completed, the user can control the file using the laptop as if the two devices were physically coupled to each other. That is, the output of the wall screen can be controlled using the signal input device of the laptop.

The network coupling is irrelevant to the types of devices. In general, a personal device such as a laptop, a personal digital assistant (PDA), and a mobile communication terminal is coupled to shared devices such as a large display and an electronic board. The network system according to the present invention supports multiple coupling. For example, three keyboards and one display can be coupled to each other to be controlled. In addition, the network system according to the present invention can provide audio feedback to point the coupling state of respective devices.

Figure 2:
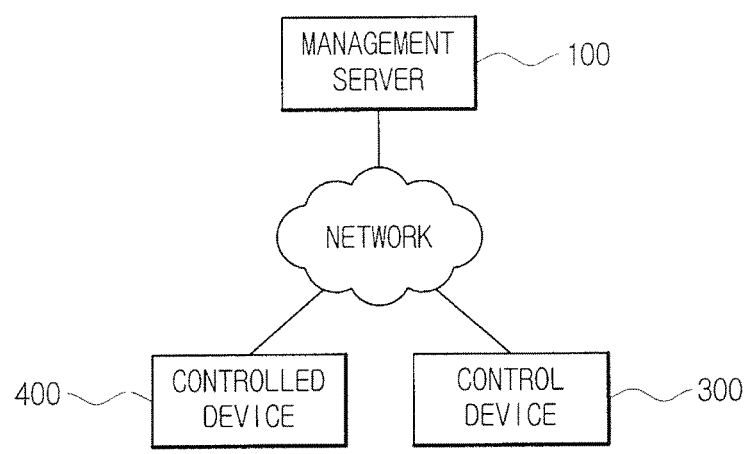
FIG. 2 is a view illustrating a system for controlling devices and information on a network by hand gestures according to an exemplary embodiment of the present invention.
Figure 3:
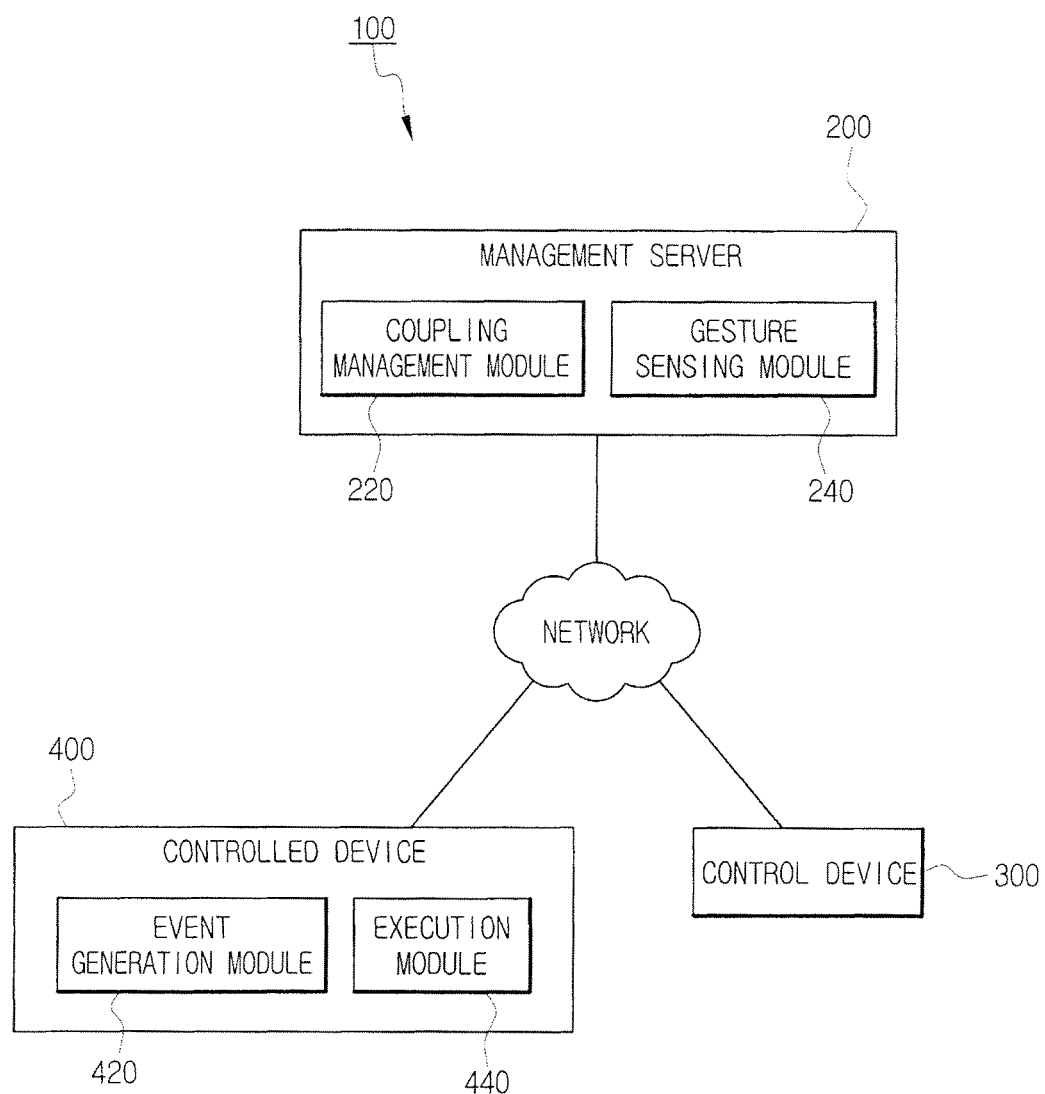
FIG. 3 is a block diagram illustrating the structure of the network system of FIG. 2.

FIG. 2 is a view illustrating a system for controlling devices and information on a network by hand gestures according to an exemplary embodiment of the present invention. FIG. 3 is a block diagram illustrating the structure of the network system of FIG. 2.

Referring to FIGS. 2 and 3, a network system 100 according to the present invention includes a management server 200, a control device 300, and a controlled device 400. The entire network is based on asynchronous communication so that blocking is minimized while data are transferred.

The management server 200 interprets the hand gestures of the user selecting a specific control device and pointing the controlled device to network couple the control device 300 and the controlled device 400 to each other. The management server 200 can include a coupling management module 220 and a gesture sensing module 740.

The coupling management module 220 controls network coupling among multiple devices based on network information such as the Internet protocol address, the port number, and the ID number of each device. The gesture sensing module 240 analyzes vision information received from a camera (not shown) to interpret the hand gesture of the user. The vision information means data extracted from an image of photographing the hand gesture of the user.

The control device 300 searches a data input or a file selection performed through the input event of the user using, for example, a keyboard or a mouse and transfers the data to the device selected in accordance with the information of the management server 200.

The control device 300 can be formed of a table top, a laptop, a PDA, or a mobile communication terminal, but is not limited to the above.

The controlled device 400 for analyzing the data transferred from the control device to display the interpreted data. The controlled device 400 can include an event generation module 420 and an execution module 440. The controlled device 400 can be formed of a wall screen and a display such as a liquid crystal display (LCD) and a plasma display panel (PDP), but is not limited to the above.

The event generation module 420 interprets the data transferred from the control device 300 and generates a signal input event such as a keyboard event or a mouse event. Here, the event means the signal transferred to an information processing device such as a computer when the user operates the control device 300.

The execution module 440 executes the file transferred from the control device 300.

In addition, the controlled device 400 supports the multiple coupling of the control device 300.

Sensing a hand gesture is a basic factor of executing the network system 100. The bare hand of the user to which no device is attached can be used as an input device.

A camera (not shown) such as a universal serial bus (USB) web camera or a network camera photographs the hand gesture of the user and provides a filtered image to the management server 200 based on an algorithm of searching and tracking the hand or the end of a finger.

Figure 4:
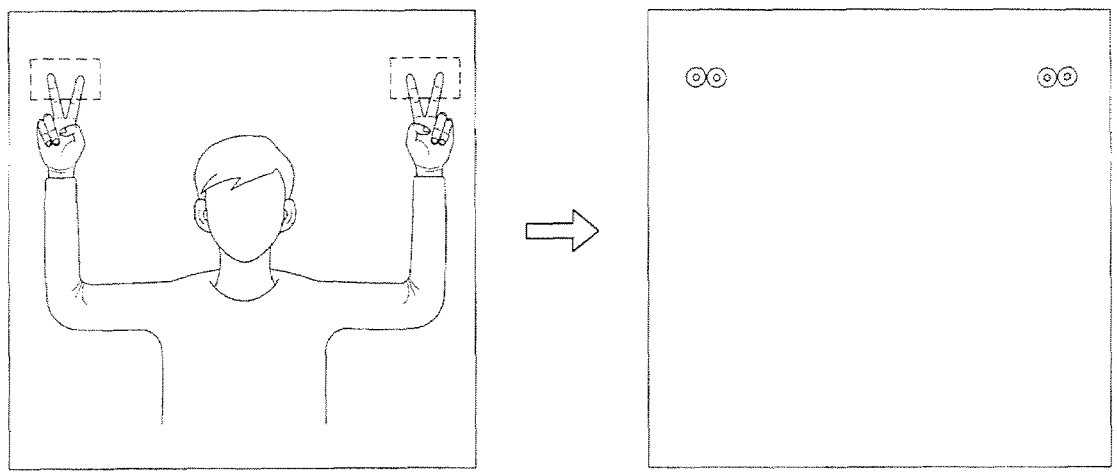
FIG. 4 is a view illustrating an image of searching the end of a finger of a user.

In order to search the hand or the end of the finger, technologies suitable for removing, a background and extracting a skin region are used and various geometric filters can be introduced. FIG. 4 is a view illustrating an image of searching the end of the finger of the user.

Since the initial positions of the controlled devices are fixed in general, the device pointed by the user can be sensed by analyzing the direction of the hand or the finger on the image. That is, direction information is obtained by analyzing the direction of the hand or the finger and the pointed controlled device is sensed by analyzing previously stored information on the positions of controlled devices. Of course, when the positions of the controlled devices are changed, the changed positions can be stored again.

In case the controlled devices move, a camera for tracking the positions of all of the devices may be provided additionally. The pointed controlled device can be sensed by analyzing the positions of the devices in a current state together with information on the direction pointed by the hand or the finger of the user as described above.

More than one hand or the end of the finger can be correctly searched and traced by a tracking algorithm even under against a complicated background or under dynamically changing light conditions. The device pointed by the hand or the end of the finger of the user can be easily identified by the tracking algorithm in real time. In addition, the hand or the end of the finger of the user can be used as an air mouse providing wireless presentation.

As an actual example of the system for controlling devices and information on a network by hand gestures, in order to effectively perform a cooperation work such as team meeting or seminar presentation, a space consisting mainly of a touch-action table top display and a peripheral wall screen is assumed.

A pan-tilt-zoom IP camera is provided at the center of the ceiling of a meeting room to sense the hand gesture of the user.

While working in the space, users often feel it is necessary to share the files stored in different positions, i.e., in the personal devices of participants or the table top display, in the wall screen. In a conventional art, in order to transfer the data to another computer, a USB storage medium, a file transfer protocol (FTP), or the Internet is commonly used and the keyboard or the mouse connected to the computer of the wall screen must be used to control information on the wall screen.

Figure 5A:
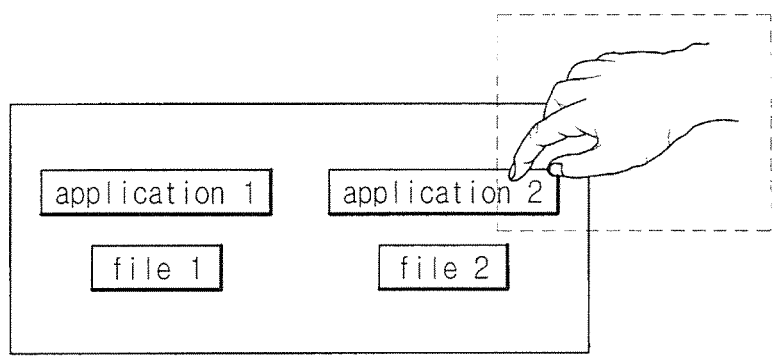
FIGS. 5A and 5B are views illustrating processes of a user selecting a file and pointing the selected file by a wall screen to transfer the file on a table top display to the wall screen.
Figure 5B:
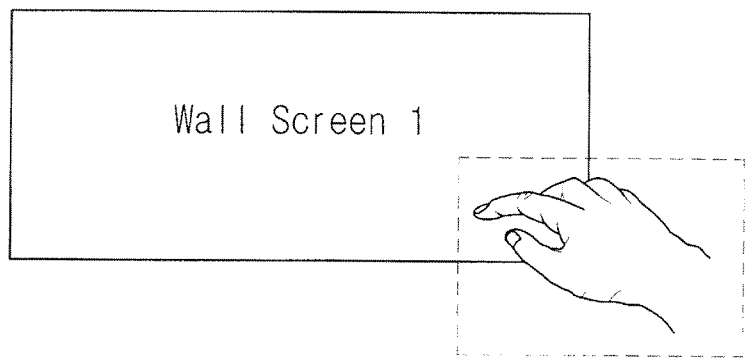

However, when the network system according to the present invention is used, as illustrated in FIGS. 5A and 5B, the user can transfer a file on the table top display to the wall screen and execute the transferred file on the wall screen by selecting a terminal control device and a file or an application to be executed and pointing the wall screen. Through this action, the table top display and the wall screen are wirelessly or wiredly connected to each other through a network and the file is transferred to the computer of the selected wall screen and executed.

At this time, the control device and the file to be executed can be selected at once. The file to be executed can be selected by touching the file to be executed on a touch screen by a hand or by inputting a selection signal using the signal input device such as the keyboard or the mouse.

Figure 6A:
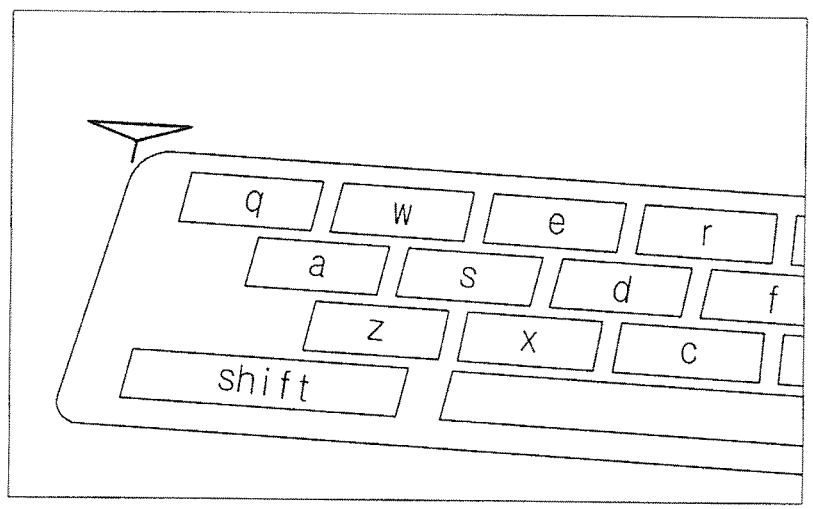
FIGS. 6A and 6B are views illustrating the coupling between a virtual keyboard on the table top display and a controlled device.
Figure 6B:
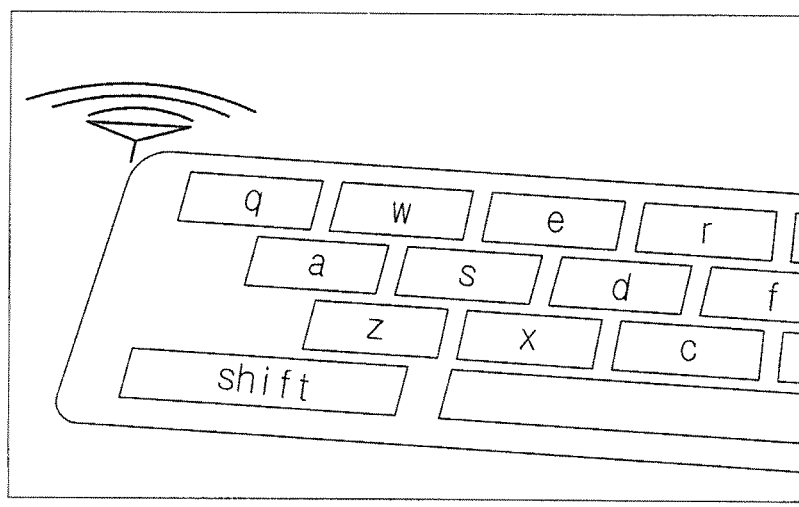

FIGS. 6A and 6B are views illustrating the coupling between a virtual keyboard on the table top display and a controlled device.

Referring to FIGS. 6A and 6B, the virtual keyboard and the mouse on the table top display can be connected to each other by the pointed computer of the wall screen and the user first generates a T-shaped icon, which indicates that the preparation of a new virtual coupling is completed, on the table top display. Of course, the shape of the icon is not limited to T.

Then, after attaching the icon using the virtual keyboard or mouse, the user points one of the wall screens with a finger.

Then, with a sound feedback informing that coupling is successfully established, the user can control the contents of the wall screen as if the keyboard or the mouse on the table top display were physically connected to the computer of the wall screen.

Disconnection can be performed easily by removing the virtual keyboard and mouse. In the above processes, as illustrated in FIG. 6B, the coupling state can be confirmed visually and a visual feedback indicating the coupling state between various keyboards and mice on the table top display and the wall screen can be provided.

Figure 7:
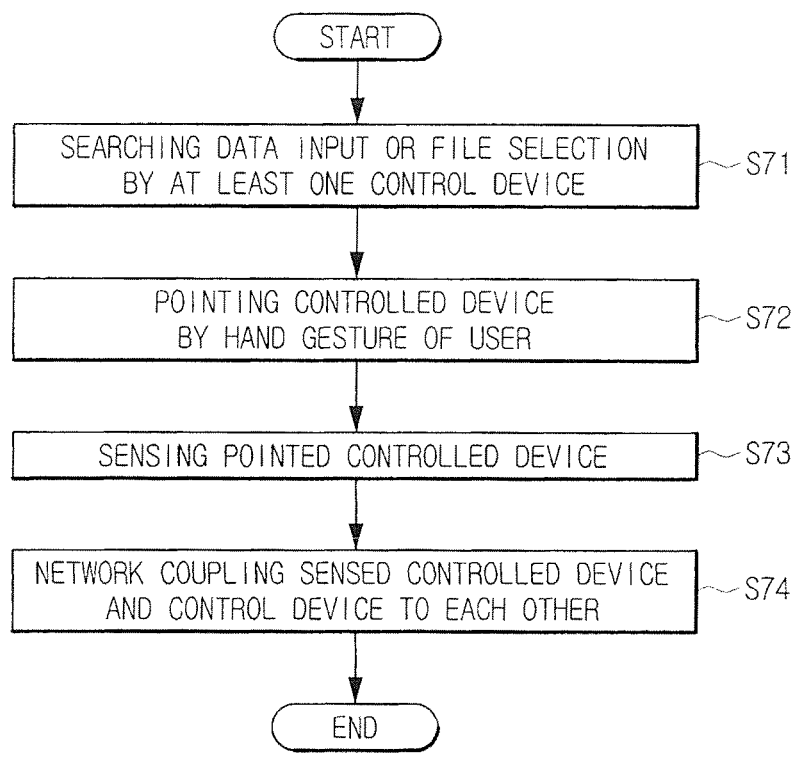
FIG. 7 is a flowchart illustrating the processes of a method of networking devices by hand gestures according to the present invention.

FIG. 7 is a flowchart illustrating the processes of a method of networking devices by hand gestures according to the present invention.

Referring to FIG. 7, the method of networking devices by hand gestures according to the present invention includes a step of searching a data input or a file selection in at least one control device (S71), a step of pointing at least one controlled device by the hand gesture of the user (S72), a step of analyzing the hand gesture of pointing the controlled device and sensing the pointed controlled device (S73), and a step of coupling the sensed controlled device and the control device to each other (S74).

In addition, a step of controlling the controlled device by the control device using the coupled network can be further included. That is, display and execution in the controlled device can be controlled through an input on the control device. For example, when the network between the control device and the controlled device is formed by selecting the file of the control device and pointing the controlled device, the selected file can be displayed on the controlled device. Then, display control such as such as enlargement or reduction and a data input control such as data correction can be performed using the control device.

The pointed controlled device can be sensed based on the hand gesture direction information obtained by analyzing a vision information in the image of photographing the hand gesture of the user and based on the previously stored information on the positions of the controlled devices. That is, the positions of the controlled devices are stored and the pointed controlled device can be sensed using the information on the stored positions of the controlled devices and based on the information on the point direction of the hand gesture.

In addition, the pointed controlled device can be sensed based on the hand gesture direction information obtained by analyzing a vision information in the image of photographing the hand gesture of the user and based on the information on the positions of the controlled devices obtained from an image of photographing the controlled devices. That is, in case the positions of the controlled devices are variable, the information on the positions of the controlled devices is obtained by photographing the controlled devices using a camera and the pointed controlled device can be sensed using thus obtained position information and the information on the point direction of the hand gesture.

When network coupling the sensed controlled device and the control device to each other, the network identification address of the control device and the network identification address of the controlled device can be used. At this time, an Internet protocol (IP) address or a port number can be used as the network identification address.

The above description on the exemplary embodiments of the system for controlling devices and information on a network by hand gestures is also applied to the exemplary embodiments of networking devices by hand gestures.

What is claimed is:

1. A system for controlling devices and information on a network by hand gesture movements, comprising:
    a control device for searching a data input or a file selection:
    a controlled device separate from the control device for interpreting data transferred from the control device to display the interpreted data;
    a management server for, when a control device is selected by a user and when a controlled device is pointed at by a hand gesture of the user, analyzing the hand gesture movement of the user leading to the pointing at to identify the controlled device pointed at by the hand gesture of the user and network coupling the selected control device and the controlled device which is pointed at by the hand gesture of the user to each other based on the Internet protocols (IP) and port numbers of the control and controlled devices; and a camera for photographing the controlled device and for providing a position tracking image of the controlled device to the management server.

2. The system as claimed in claim 1, wherein the management server comprises:
a coupling management module for controlling network coupling based on an Internet protocol (IP) address and a port number of the control device; and
a gesture movement sensing module for analyzing vision information of photographing a hand gesture movement of a user and interpreting the hand gesture motion of the user.

3. The system as claimed in claim 1, wherein the camera photographs a hand gesture movement of a user and provides a filtered image based on an algorithm of searching and tracking a hand or an end of a finger to the management server.

4. The system as claimed in claim 3, wherein the camera is a universal serial bus (USB) web camera or a network camera.

5. The system as claimed in claim 1, wherein the control device is a virtual keyboard or mouse on a table top display, and wherein an icon is generated for virtual coupling on the table top display by a user, the icon is attached to the virtual keyboard or mouse, and the controlled device is pointed to by a hand gesture movement to connect the pointed-to controlled device.

6. The system as claimed in claim 1, wherein the management server performs network coupling between at least one control device and at least one controlled device by sensing at least two hand gestures movements.

7. A networking method of devices by hand gestures movements, comprising:
searching a data input or a file selection by at least one control device;
pointing at at least one controlled device by a hand gesture movement of a user;
sensing the at least one pointed at controlled device by analyzing the hand gesture movement of the user to identify the at least one controlled device pointed at by the hand gesture movement of the user; and
network coupling the at least one sensed controlled device and the control device which is pointed at by the hand gesture of the user to each other based on the Internet protocols (IP) and port numbers of the control and controlled devices,
whereby, the pointed-to controlled device is sensed based on hand gesture movement direction information obtained by analyzing photographic image information of the hand gesture movement of the user and on information on positions of controlled devices obtained by analysis of photographic images of the controlled devices.

8. The networking method as claimed in claim 7, wherein, in network coupling the sensed controlled device and the control device to each other, network coupling is performed by using a network identification address of the control device and a network identification address of the controlled device.

9. The networking method as claimed in claim 7, further comprising controlling the controlled device by the control device using the coupled network.

10. The system as claimed in claim 1, wherein the camera is a universal serial bus (USB) web camera or a network camera.

* * * * *